(12) United States Patent
Erben et al.

(10) Patent No.: US 8,172,183 B2
(45) Date of Patent: May 8, 2012

(54) BAGGAGE ACCOMMODATION DEVICE

(75) Inventors: Johann Erben, Hamburg (DE);
Elisabeth Masset-Bosc, Plaisance du Touch (FR)

(73) Assignees: Airbus S.A.S. (FR); Airbus Operations GmbH (DE)

( * ) Notice: Subject to any disclaimer, the term of this patent is extended or adjusted under 35 U.S.C. 154(b) by 754 days.

(21) Appl. No.: 12/084,279

(22) PCT Filed: Oct. 31, 2006

(86) PCT No.: PCT/EP2006/010475
§ 371 (c)(1),
(2), (4) Date: Feb. 10, 2009

(87) PCT Pub. No.: WO2007/051593
PCT Pub. Date: May 10, 2007

(65) Prior Publication Data
US 2009/0166474 A1 Jul. 2, 2009

(30) Foreign Application Priority Data

Oct. 31, 2005 (DE) .......................... 10 2005 051 987
Apr. 26, 2006 (FR) ..................................... 06 03692

(51) Int. Cl.
*B64D 9/00* (2006.01)
(52) U.S. Cl. .................................................. 244/137.1
(58) Field of Classification Search ............... 244/118.1, 244/137.1; 414/803; 108/57.15
See application file for complete search history.

(56) References Cited

U.S. PATENT DOCUMENTS

| 1,614,705 | A |   | 1/1927  | Amsler |
|-----------|---|---|---------|--------|
| 1,740,000 | A | * | 12/1929 | Andrews et al. ............... 220/1.5 |
| 2,402,283 | A |   | 6/1946  | Hewitt |
| 2,498,906 | A | * | 2/1950  | Apperson .................. 244/137.1 |
| 3,473,762 | A |   | 10/1969 | Platt |
| 3,999,727 | A | * | 12/1976 | Rennemann .................. 206/298 |
| 4,009,792 | A | * | 3/1977  | Sano et al. .................... 414/512 |
| 4,757,504 | A | * | 7/1988  | Stambaugh et al. .......... 714/801 |
| 5,941,405 | A | * | 8/1999  | Scales et al. .................... 220/1.5 |
| 6,113,031 | A |   | 9/2000  | Williams et al. |
| 2003/0223838 | A1 |   | 12/2003 | Looker |

FOREIGN PATENT DOCUMENTS

| DE | 768071       | 6/1955  |
| DE | 1941618      | 2/1971  |
| DE | 9410660 U    | 11/1995 |
| DE | 19643545     | 5/1998  |
| DE | 19811794     | 9/1999  |
| EP | 0 298 072    | 1/1989  |
| GB | 1127441 A    | 9/1968  |
| JP | 2000-142878 A | 5/2000 |
| JP | 2005-050170  | 2/2005  |
| RU | 2249514 C1   | 4/2005  |
| SU | 1796558 A1   | 2/1993  |

OTHER PUBLICATIONS

International Search Report, PCT/EP2006/010475.

* cited by examiner

*Primary Examiner* — Galen Barefoot
(74) *Attorney, Agent, or Firm* — Lerner, David, Littenberg, Krumholz & Mentlik, LLP

(57) ABSTRACT

A baggage accommodation device for an aircraft, which device comprises a plurality of first rollers and a container, wherein the container comprises a base plate. The plurality of first rollers are arranged on the base plate, and the baggage accommodation device is designed such that it is sufficiently stable for said baggage accommodation device to be able to be moved into and out of the aircraft.

24 Claims, 7 Drawing Sheets

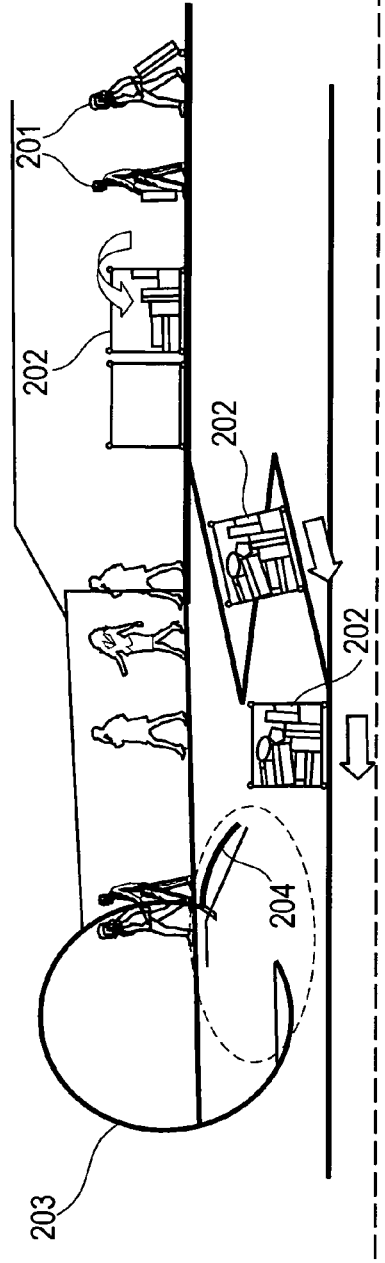
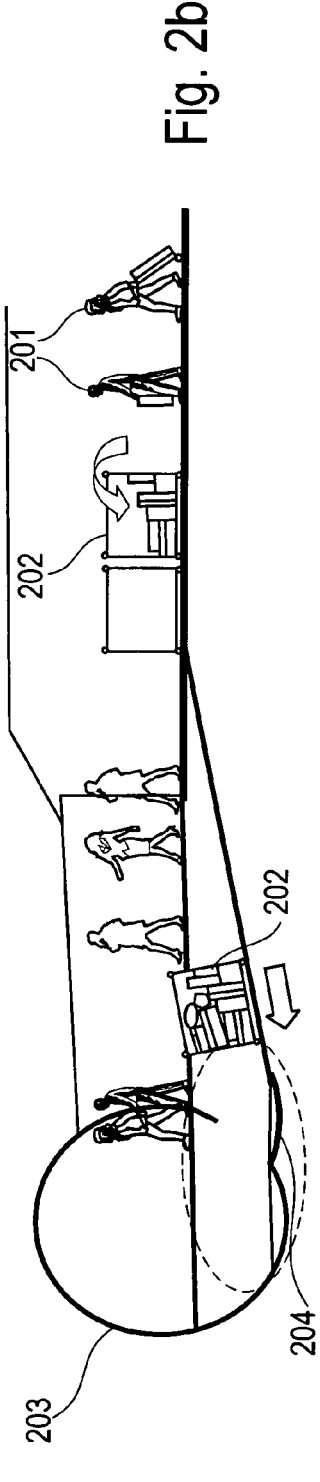
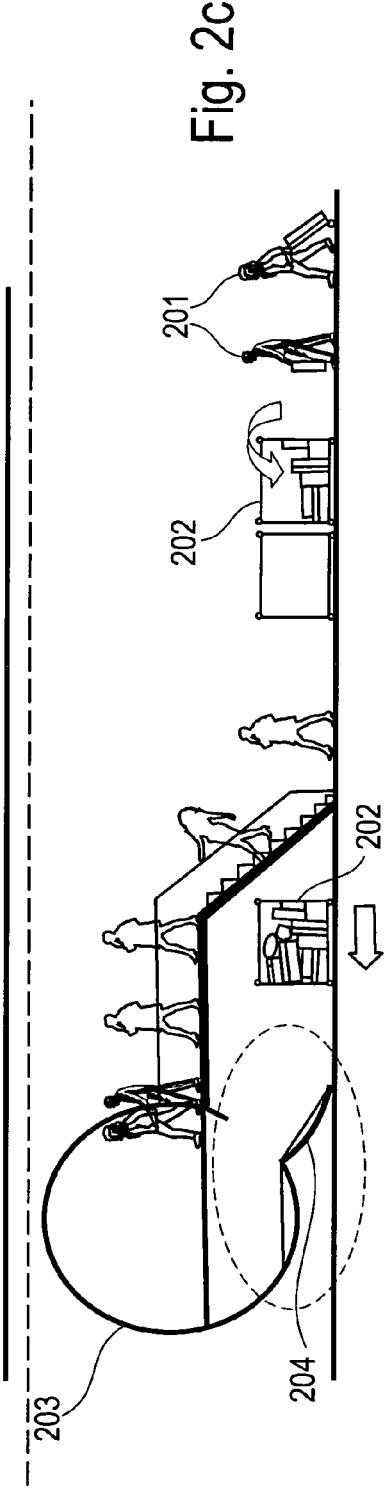

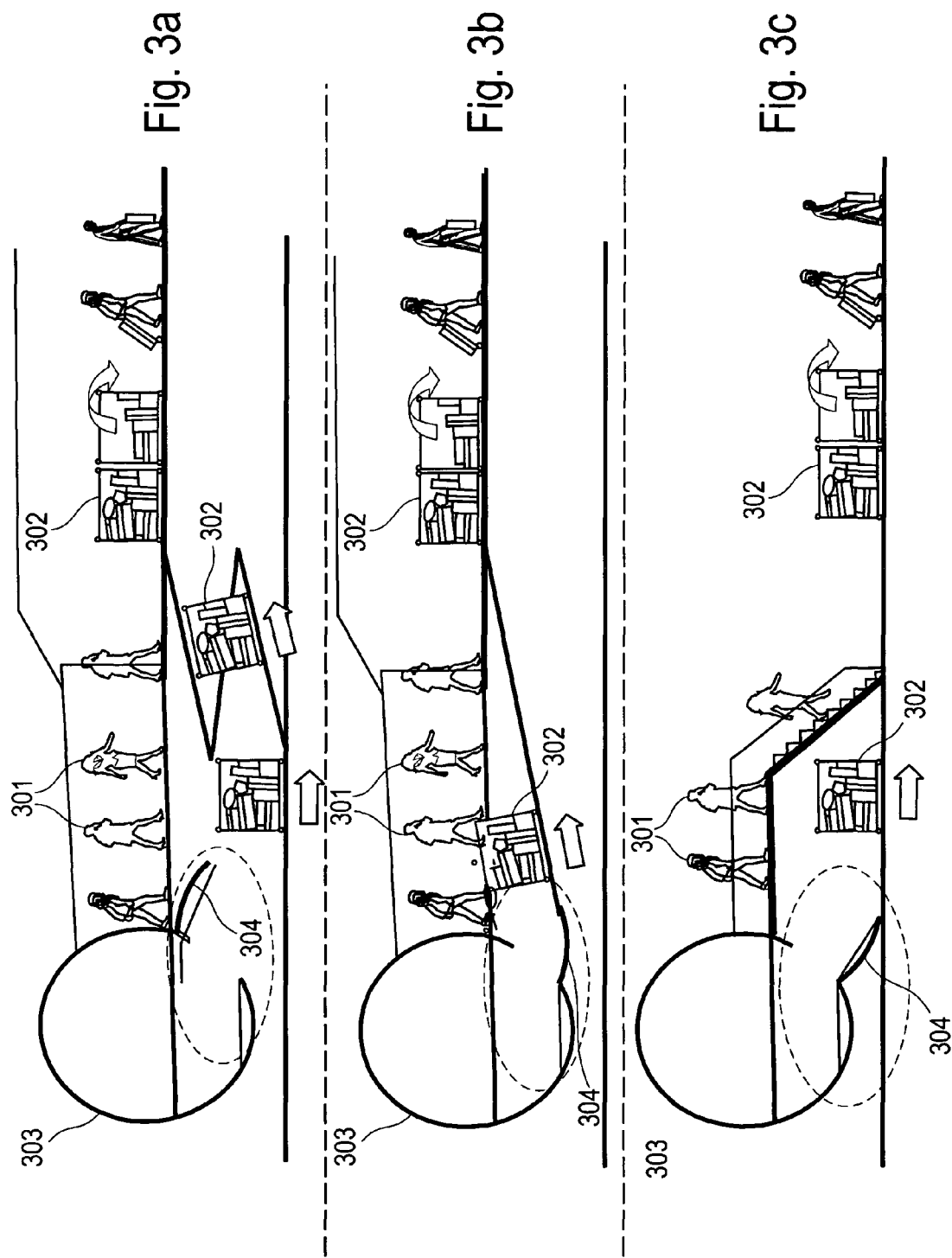

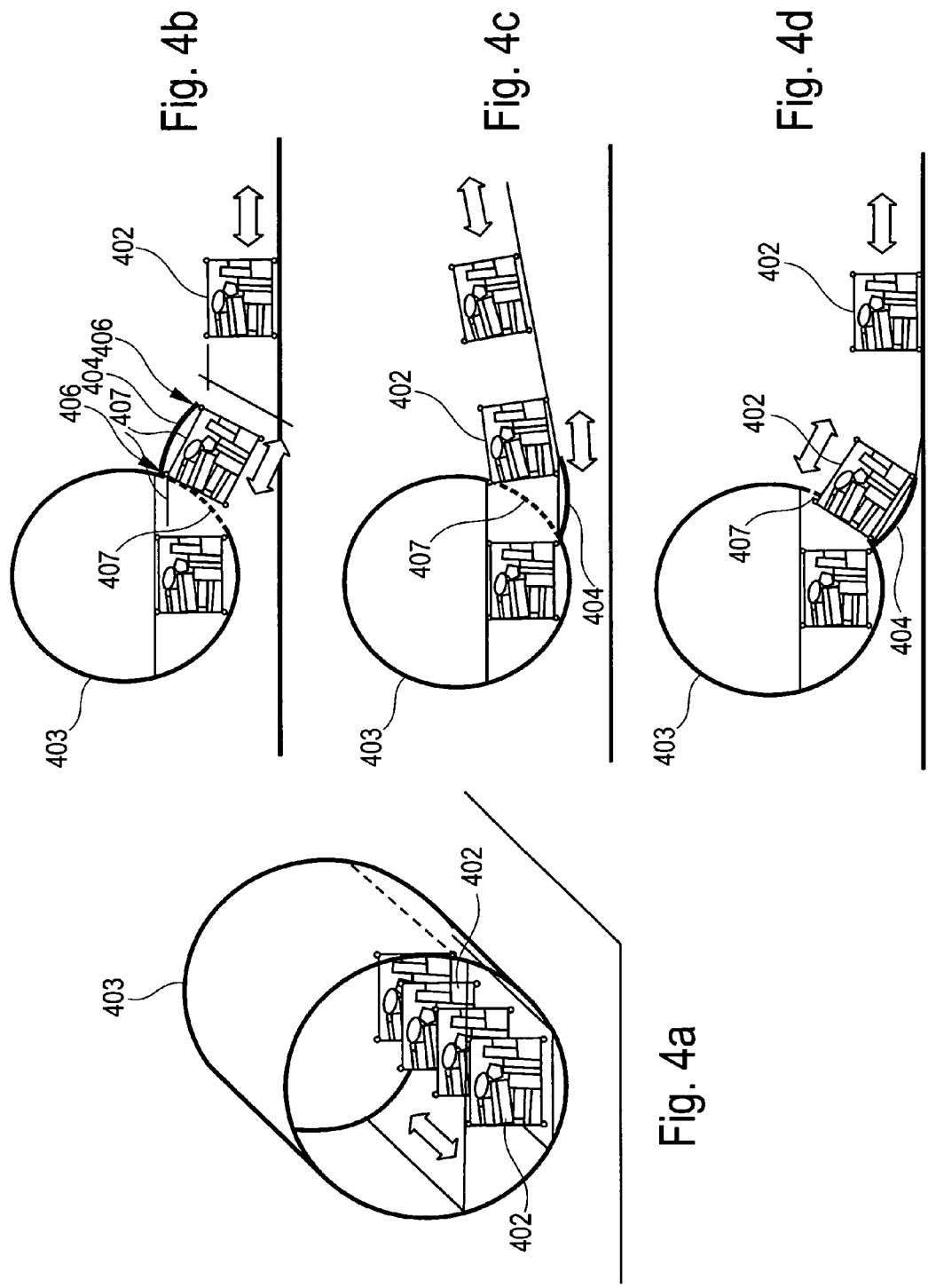

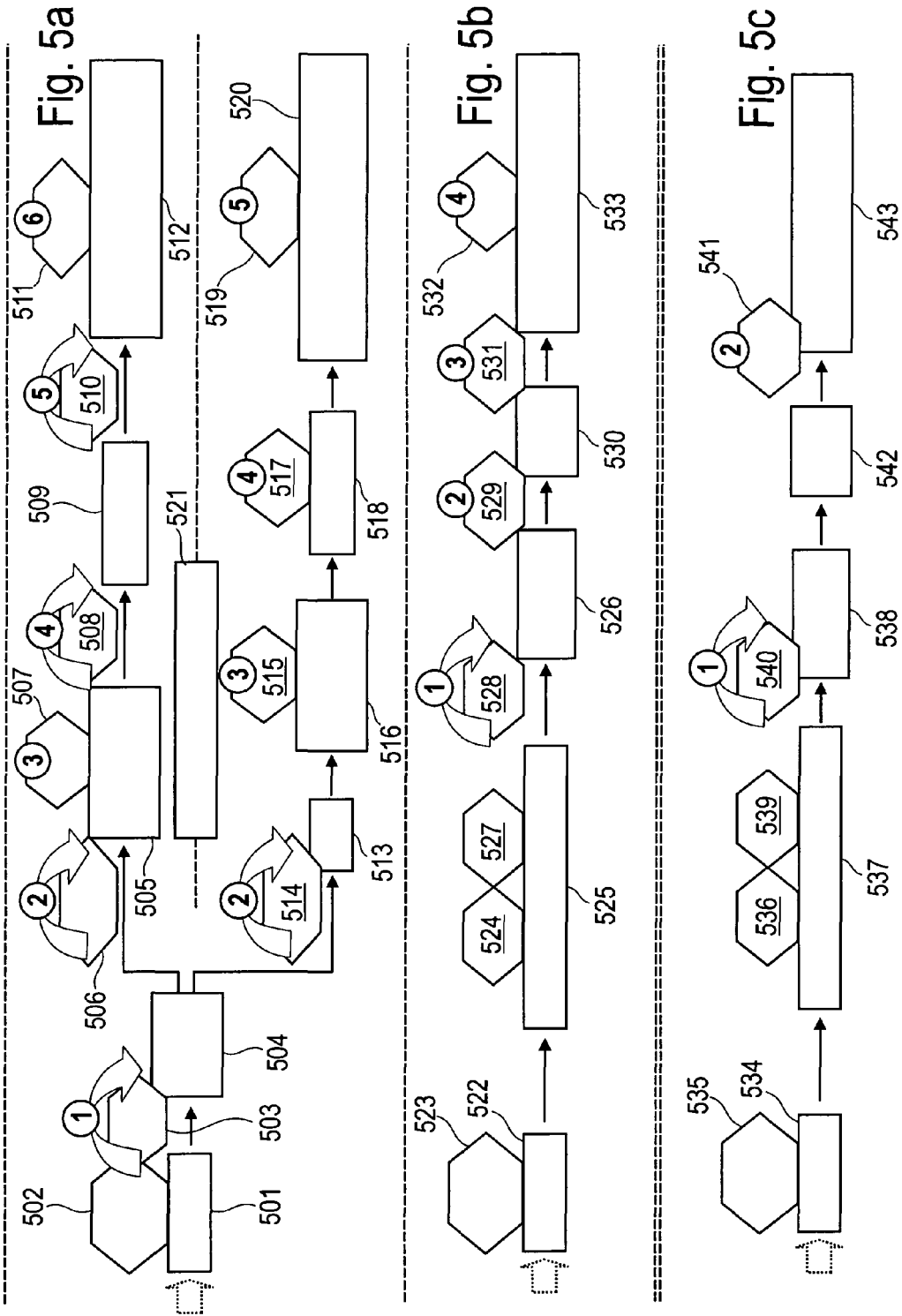

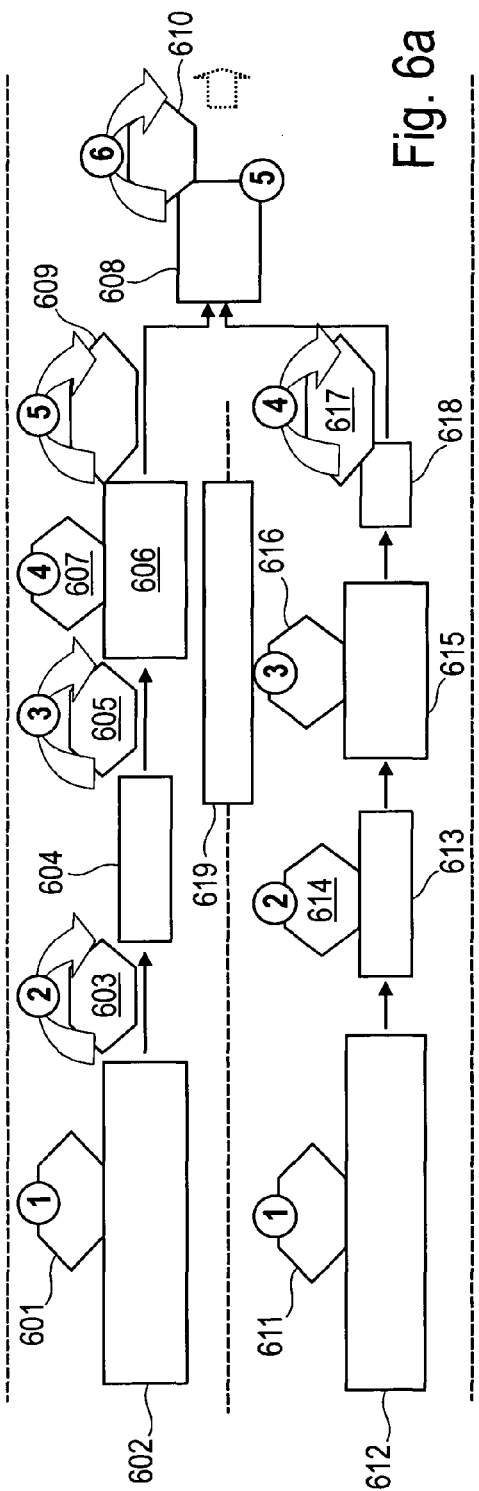
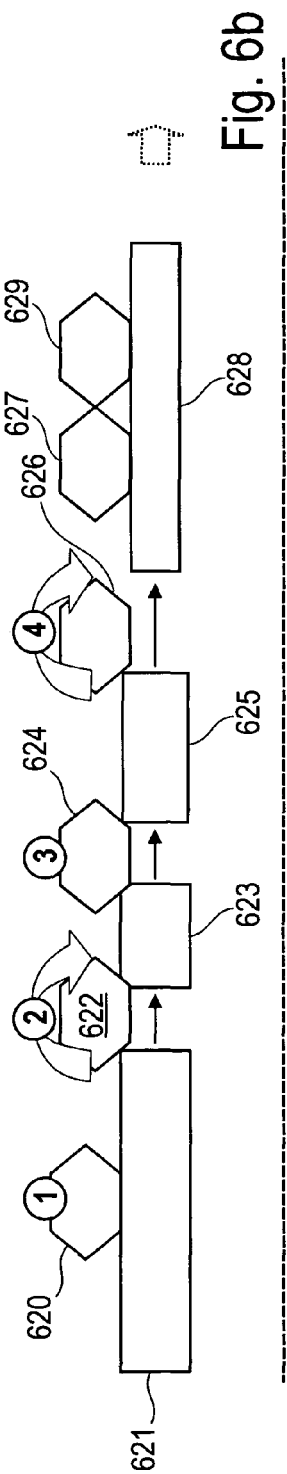
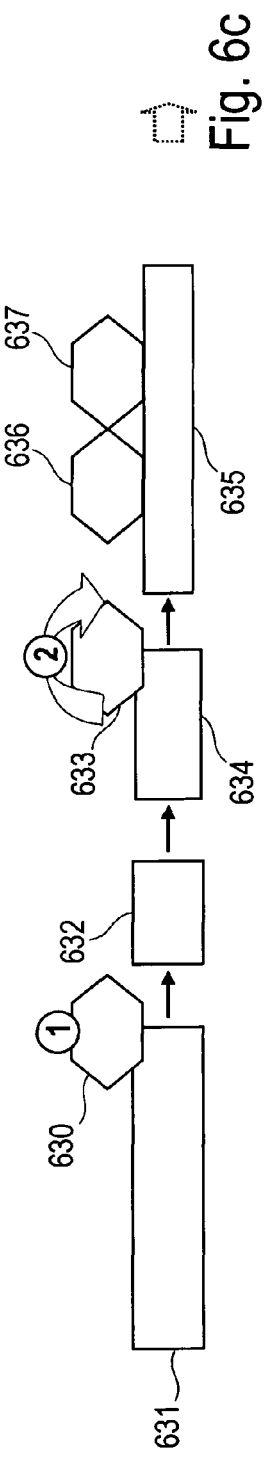
Fig. 6a
Fig. 6b
Fig. 6c

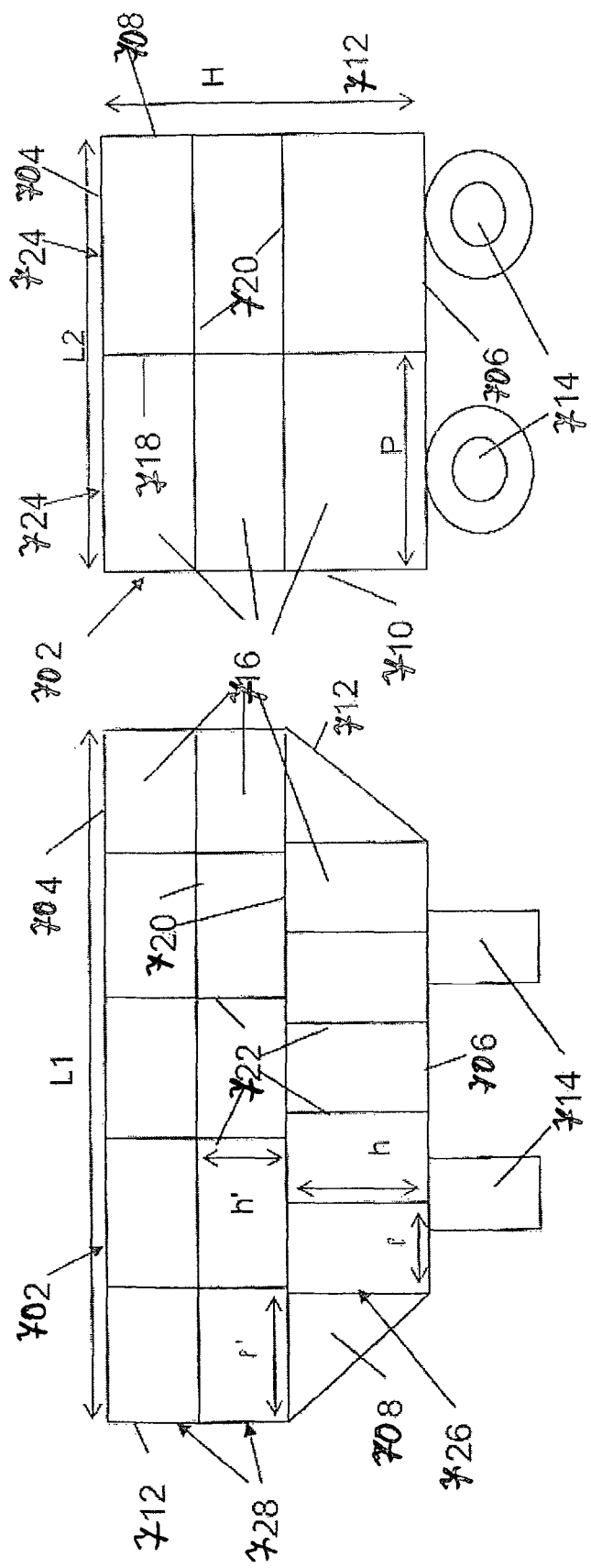

BAGGAGE ACCOMMODATION DEVICE

This application claims the benefit of the filing date of German Patent Application No. 10 2005 051 987.3 filed Oct. 31, 2005, and French Patent Application No. 06/03692 filed Apr. 26, 2006, the disclosures of which are hereby incorporated herein by reference.

FIELD OF THE INVENTION

The present invention relates to a baggage accommodation device, a cargo hold door for an aircraft, an aircraft comprising a cargo hold door, and a method for operating the baggage accommodation device. Furthermore, the invention relates to a container for items of luggage, in particular items of luggage of aircraft passengers.

BACKGROUND OF THE INVENTION

Devices for accommodating baggage are used in many fields. One example of use involves baggage accommodation devices as used in aviation for the purpose of accommodating passengers' baggage items. For example so-called unit load devices (ULDs) are used. However, their use for check-in baggage in large or small aircraft is rather complicated. The process requires a long sequence of steps involving the check-in baggage, which steps involve various and expensive transport systems. In a plurality of loading and unloading steps the baggage is loaded to the transport systems and unloaded from them, wherein a number of persons are required who have to have various abilities, some of which are specialised.

In various means of public transport, in particular trains and aircraft, the passengers take along items of luggage. It may be items of luggage which accompany the passenger throughout his journey or luggage entrusted, at one time or another, to the carrier (railway company, airline company, ... ). These items of luggage are therefore checked in and then conveyed to the vehicle (train, aircraft, ... ) in which they are stowed in a special compartment (luggage van, hold, ... ).

In the case of some regional flights, it is known either to take along an item of luggage with oneself into the aircraft cabin or to have an item of luggage checked in at the time of the passenger check-in or alternatively, in the case of items of luggage of intermediate size, to entrust the luggage at the foot of the aircraft so that it can be recovered upon arrival, upon descending from the aircraft.

In all cases where the items of luggage are entrusted during check-in or just before boarding the vehicle (aircraft), the items of luggage are placed loose on a trolley or in a container. When the items of luggage are recovered, upon descending from the aircraft or on a conveyor belt, there is always a risk of confusion of items of luggage, for example with a similar item of luggage.

SUMMARY OF THE INVENTION

There may be a need to provide a device for accommodating baggage, a cargo hold door for an aircraft, a method for operating the device for accommodating baggage, and the use of the baggage accommodation device in an aircraft, which all meet modern requirements. Furthermore, there may be a need to provide means permitting a passenger to recover his luggage reliably and quickly.

This need may be met by a device for accommodating baggage, a cargo hold door for an aircraft, a method for operating the device for accommodating baggage, and the use of the baggage accommodation device in an aircraft, according to the features of the independent claims.

According to an exemplary embodiment of the present invention, the above need may be met by a baggage accommodation device for an aircraft, which device comprises a plurality of first rollers and a container, wherein the container comprises a base plate. The plurality of first rollers are arranged on the base plate, and the baggage accommodation device is designed such that it is sufficiently stable for said baggage accommodation device to be able to be moved into and out of the aircraft.

According to an exemplary embodiment of the present invention, a cargo hold door for an aircraft comprises at least one rail, wherein the rail, of which there is at least one, is designed in such a way that in it a baggage accommodation device according to an exemplary embodiment of the invention can be accommodated. In particular, at least one of the first rollers may be accomodatable in the rail.

According to an exemplary embodiment of the invention, an aircraft comprises a cargo hold and a cargo hold door according to an exemplary embodiment of the invention.

According to an exemplary embodiment of the invention, a method for operating a baggage accommodation device comprises loading the baggage accommodation device with items of baggage. Furthermore, the baggage accommodation device is conveyed to a cargo hold door of an aircraft, and the baggage accommodation device is placed in a cargo hold of the aircraft. Loading the baggage accommodation device can, for example, be carried out by passengers. Conveyance to the aircraft is preferably carried out by rolling. In particular, the baggage accommodation device may be rolled to and into the aircraft on the first rollers.

As an alternative, the method for operating a baggage accommodation device can also relate to a procedure of unloading an aircraft, which unloading procedure involves unloading the baggage accommodation device from a cargo hold of an aircraft, conveying the baggage accommodation device away from the aircraft, and unloading items of baggage from the baggage accommodation device. The conveyance away from the aircraft is preferably carried out by means of rolling, while the unloading of items of baggage is preferably undertaken by passengers.

A fundamental idea of the invention may consist of a baggage accommodation device for an aircraft being used. The baggage accommodation device could also be referred to as a wheely loader; it is a simple device of lightweight design by which device baggage, in particular suitcases, may be accommodated, and conveyed without any further transfer procedures directly into an aircraft. Preferably, the wheely loader comprises four first rollers and is preferably cuboid in shape, wherein preferably the top or upper area is open, through which the wheely loader may be loaded in a simple manner. The rollers may be designed in the form of ball rollers or cylindrical rollers. The loading process may also be carried out by passengers. In particular, loading may also be undertaken in direct proximity of the aircraft, for example on the runway or apron of an airport. In this way the baggage transport procedure and baggage loading procedure may be considerably simplified. Present-day processes, which are time-consuming, cost-intensive and susceptible to malfunctions may be able to be simplified with the use of a baggage accommodation device according to an exemplary embodiment of the invention. In particular, if loading of the baggage accommodation device is undertaken by passengers themselves, any negative effects that passengers experience in conventional loading procedures as a result of the above-mentioned disadvantages, may be prevented or at least reduced. This may, in particular, be the case because many passengers are unhappy if they have to hand over their baggage to a system that to them is invisible and incomprehensible, and when they cannot be certain that their baggage is on board at all.

Furthermore, according to the invention it may be possible to reduce the number of persons necessary for handling the baggage. The baggage accommodation device may combine the advantages of various systems, in particular of the so-called Unit Load Device with the procedures implemented at small regional airports, in which procedures it is often the case that passengers themselves have to transport the baggage to the runway area, from where personnel moves the baggage individually into the cargo hold of an aircraft.

By an exemplary embodiment of the invention it may also be possible to reduce the number of steps that are required from check-in to loading the baggage into the aircraft. Furthermore, it may be possible to considerably simplify and speed up the loading and unloading process. Passengers may find it a positive experience if they have improved and direct control over their baggage. Furthermore, it may be possible for their baggage to be available immediately after they leave the aircraft, so that passengers are not in a situation where they can pick up their baggage only after some considerable time on a baggage carrousel.

The rollers of the baggage accommodation device may be designed so as to be relatively light and simple because the baggage accommodation device may be applied in particular to be rolled only over short distances. Moreover, the rollers may have a relatively small diameter because the baggage accommodation device is only moved over relatively short distances; it may thus be possible to make better use of available space.

The baggage accommodation device is preferably sufficiently stable to accommodate a plurality of suitcases. In particular the baggage accommodation device may comprise a capacity of 10 to 50 suitcases, in particular of 20 to 40 suitcases and/or a load capacity of 100 to 1500 kg, in particular of 200 to 800 kg, particularly preferred of 200 to 400 kg. A maximum load capacity of less than 400 kg may be a suitable size that may ensure that the baggage accommodation device is relatively easy to move, wherein furthermore it may be possible to realise a relatively lightweight design of the baggage accommodation device. Furthermore, such an upper limit may be compatible with stacking the items of baggage, in which baggage accommodation device the items of baggage can be easily removed, i.e. not too many items of baggage may be arranged one on top of the other in the baggage accommodation device. Preferably, the baggage accommodation device may be designed such that a singular layer of items of baggage, for example suitcases, can be accommodated, i.e. the stacking of several suitcases, one above the other, is avoided.

The baggage accommodation device can comprise a base area of between approximately 243 cm (96 inch) by approximately 318 cm (125 inch) to approximately 119 cm (47 inch) by approximately 153 cm (60.4 inch). In particular, the base area can be between approximately 119 cm by approximately 153 cm and approximately 153 cm by approximately 156 cm (61.5 inch). A height of the baggage accommodation device can be between approximately 80 cm and approximately 180 cm, in particular between approximately 114 cm (45 inch) and approximately 162 cm (64 inch). Suitable sizes of the baggage accommodation device are approximately 153 cm by approximately 156 cm by approximately 162 cm (60.4"×61.5"×64"), approximately 119 cm by approximately 153 cm by approximately 162 cm (47"×60.4"×64") and approximately 119 cm by approximately 153 cm by approximately 114 cm (60.4"×61.5"×45"). Further suitable sizes may be approximately 153 cm by approximately 243 cm by approximately 162 cm (60.4"×96"×64"), approximately 153 cm by approximately 318 cm by approximately 162 cm (60.4"×125"×64"), approximately 224 cm by approximately 318 cm by approximately 162 cm (88"×125"×64") and approximately 243 cm by approximately 318 cm by approximately 162 cm (96"×125"×64"). In all the above geometric shapes the last number denotes the height of the baggage accommodation device.

The above-mentioned geometric shapes may be particularly suited to the use of the baggage accommodation device in cargo compartments of commonly used aircraft.

The baggage accommodation device may also comprise inclined lateral surfaces and/or inclined partial lateral surfaces so that they are somewhat trapezoidal in cross section. When inclined lateral surfaces are used it may be possible to arrange the baggage accommodation device particularly efficiently in a cargo compartment that does not comprise a cuboid cross section but instead, for example, a round cross section. The baggage accommodation device can comprise a height that is between 1 cm and 10 cm, preferably approximately 5 cm, less than the height of the cargo hold of an aircraft.

The baggage accommodation device can comprise a lateral length that is between 2 cm and 20 cm, preferably approximately 10 cm, less than the lateral extension of the cargo hold of an aircraft. The material and/or the material strength of the baggage accommodation device can be selected such that when the baggage accommodation device is loaded and/or moved, the maximum deformation (deformation into a lozenge shape) (Verrautung) is less than 10 cm. This may, for example mean that lateral delimitations on the upper end of the baggage accommodation device at a standstill and/or during normal movement protrude no more than 10 cm beyond the lateral delimitation of a basic surface of the baggage accommodation device.

Such limitation of the deformation may, in particular, be important to ensure that ease of movement of the baggage accommodation device through a cargo compartment door of an aircraft remains ensured.

Further objects, exemplary embodiments and advantages of the invention result from the further independent claims and the dependent claims.

Below, exemplary embodiments of the baggage accommodation device are described, wherein embodiments that are described in the context of the baggage accommodation device also apply to the cargo hold door for an aircraft, to the aircraft comprising a cargo hold door, and to the method for operating the baggage accommodation device.

According to an exemplary embodiment, the container comprises a plurality of essentially vertical lateral surfaces, wherein one of the essentially vertical lateral surfaces is open, or wherein all essentially vertical lateral surfaces are closed.

Providing an open lateral surface in the container may make it possible to design a loading process and an unloading process of the baggage accommodation device in a particularly simple manner. Creating a baggage accommodation device that is enclosed all around may be a more efficient way of providing good protection to items of baggage, within the baggage accommodation device, against sliding and falling out. In this arrangement, optionally a top, i.e. an upper surface of the container, is open or closed.

According to another exemplary embodiment of the baggage accommodation device, the container is designed as a frame construction. Preferably, the frame construction is designed such that with little intrinsic weight it is sufficiently stable. This can, for example, be achieved by suitable selection of the materials of the frame construction, for example by the use of light metals and/or carbon fibre composite materials.

Such a frame construction may be an efficient way of providing a lightweight yet at the same time adequately stable baggage accommodation device. Such a frame construction may be designed with the use of twelve tubes that are arranged along the edges of a cuboid container. For further stiffening of the baggage accommodation device it is also possible to integrate additional tubes in the frame construction, for example along some or all of the diagonals of the lateral surfaces of the cuboid container.

According to a further exemplary embodiment of the baggage accommodation device, the material of the lateral surfaces comprises textile webbing or textile straps an/or metal.

Designing the lateral surfaces with the use of a material comprising textile webbing may be an efficient way of providing a lightweight construction. In particular during interaction with a frame construction, a baggage accommodation device that is designed in a simple manner may thus become possible. In this arrangement the lateral surfaces may be designed completely or only partially with the use of woven textile webbing. A design that only partially comprises textile webbing may in particular contribute to a reduction in the weight of the baggage accommodation device. The textile webbing preferably provides adequate resistance to tearing so as to reduce the danger of breaking under load. The use of metal or sheet metal as a material may provide an option of improving the stability of the baggage accommodation device and/or of improving protection afforded to the items of baggage contained in said baggage accommodation device. Preferably, the textile webbing is tightly tensioned in the frame construction, i.e. the webbing has only little flexibility under load.

According to another exemplary embodiment, the baggage accommodation device further comprises a plurality of second rollers that are arranged on the top of the container.

By providing, preferably four, second rollers it may be possible to use the baggage accommodation device so that it interacts with so-called upper hinge doors. These are doors that for the purpose of opening a fuselage of the aircraft can be hinged upwards, for example doors that comprise a hinge on their upper edge.

According to a further exemplary embodiment of the baggage accommodation device, the plurality of first rollers are rotatably arranged on the base plate, i.e. the first rollers are held such that they can be rotated on an essentially vertical axis.

By such an embodiment it may be possible to move the baggage accommodation device particularly easily on a surface that makes it possible to easily move this device in any desired direction.

According to a further exemplary embodiment, the baggage accommodation device comprises a removable lateral panel that is designed such that by using the panel the open, essentially vertical, lateral surface is closeable.

Providing such a removable lateral panel may make it possible that on the one hand when the baggage accommodation device is loaded or unloaded, a lateral wall is open so that the baggage accommodation device can easily be loaded or unloaded. On the other hand it may be possible, by closing this lateral surface during transport of the baggage accommodation device to ensure that no items of baggage can fall from the baggage accommodation device. In this context the term "removable" also includes "able to be hinged", i.e. mere hingeing of the lateral panel.

According to a further exemplary embodiment, the baggage accommodation device is designed such that its dimensions match dimensions of a cargo hold of an aircraft or is adapted to dimensions of an aircraft. Preferably the baggage accommodation device is designed such that it can be fastened in a cargo hold of an aircraft.

Matching to the dimensions of a cargo hold can, for example, take place in that the height is selected such that it essentially agrees with the height of the cargo hold, except for some small difference that is necessary to ensure movement of the baggage accommodation device in the aircraft. By a fastenable design of the baggage accommodation device it may be possible, in flight, to prevent any sliding or movement of the baggage accommodation device.

Below, exemplary embodiments of the cargo hold door for an aircraft are described, wherein embodiments that are described in the context of the cargo hold door for an aircraft also apply to the baggage accommodation device, to the aircraft comprising a cargo hold door, and to the method for operating the baggage accommodation device.

According to another exemplary embodiment, the cargo hold door is designed as an outer fuselage door for an aircraft, wherein the cargo hold door is preferably designed as an upper hinge door or as a lower hinge door, for example as a door that by using a hinge can be attached by its top or its bottom to a fuselage. Preferably the cargo hold door comprises two rails.

In particular if the cargo hold door is designed as a lower hinge door it may be possible for the cargo hold door to be used at the same time as a loading ramp for a baggage accommodation device. To this effect, in particular, guide systems, such as for example rails, are arranged in the door. Such guide systems may also be present in the case of an upper hinge door, which guide systems cap be designed so as to accommodate rollers that are arranged at the top of the baggage accommodation device. In this way it may be possible for the baggage accommodation device in a concrete example to be hooked into the cargo hold door and to be moved in a suspended position.

According to a further exemplary embodiment, the cargo hold door further comprises a transport device, wherein the transport device is preferably designed such that by it a baggage accommodation device according to an exemplary embodiment of the invention can be moved.

Providing a transport device, i.e. for example a device which by cables or a cable pull can pull the baggage accommodation device, may be an efficient way of simplifying and speeding up loading of a baggage accommodation device in an aircraft, or unloading said baggage accommodation device from an aircraft.

Below, exemplary embodiments of the aircraft comprising a cargo hold door are described, wherein designs that are described in the context of the aircraft comprising a cargo hold door also apply to the baggage accommodation device, to the cargo hold door for an aircraft, and to the method for operating the baggage accommodation device.

According to another exemplary embodiment, the cargo hold comprises a rail system that is designed such that a baggage accommodation device according to an exemplary embodiment can be accommodated.

Providing a rail system in the aircraft may be an efficient way of making possible the movement and/or displacement of the baggage accommodation device within the aircraft. Such a rail system may, in particular, be designed such that rollers of the baggage accommodation device engage this rail system.

A baggage accommodation device according to an exemplary embodiment of the invention can, for example, be used in an aircraft.

In summary, one aspect of the invention may consist of the provision of a baggage accommodation device that combines light weight with adequate stability, and which comprises rollers so that it may be possible to use this baggage accommodation device during loading of an aircraft. In this arrangement the stability may be selected such that it is possible to roll the baggage accommodation device across short distances and to load said baggage accommodation device into an aircraft or unload it from an aircraft. In this arrangement it may be possible by way of the lightweight simple design to create a baggage accommodation device whose production is more economical than the production of known ULDs. In adescriptive way the baggage accommodation device may be designated a wheely loader that is somewhat similar to shopping trolleys in supermarkets. By using such a rollable baggage accommodation device it may be possible to reduce the number of steps during loading (boarding) and unloading (deplaning) from approximately four to six, as is the case in systems that are in common use today, to approximately two steps. Moreover, it may be possible to reduce the number of loading- and unloading steps of the baggage accommodation device or of the transport system, which steps are carried out by passengers in a way that is similar to the present-day sequences at check-in terminals, from two to four steps to one step. According to the invention it may also be possible to adapt the height of the wheely loader to the existing height of the cargo compartment of an aircraft so that, to the best extent possible, optimal use of the available space in the aircraft can be made.

Furthermore, the number of personnel involved may be reduced from three to six down to one. In addition, the requirements relating to various abilities of personnel may be reduced from two to three down to a single ability. Moreover, it may be possible to significantly simplify the work equipment that is required; for example it may be possible that there is no need to provide conveyor belts, transport vehicles, ULDs and so-called carrousels where passengers can receive their items of baggage. Furthermore, it may be possible that as a result of saving such operational means, the baggage can be received earlier following deplaning, and that passengers are more likely to feel that they are in control of their own baggage.

As an alternative or additional second aspect an exemplary embodiment of the invention provides a baggage accommodation device or container for items of luggage which container comprises internal dividing walls demarcating compartments, each compartment being intended to receive one item of luggage, and wherein each compartment comprises an opening permitting access to the compartment from outside the container.

Such a container can thus be made available to passengers before they board the aircraft, or the train, or other vehicle. The passengers can stow their item(s) of luggage there as they are boarding. After boarding has been completed, the container is taken over in order to be placed on board the vehicle (aircraft, train, . . . ). Upon arrival, the container is removed from the vehicle, preferably with priority, and the passengers can then recover their items of luggage. Since the latter are arranged in compartments, the order in which the items of luggage are removed from the container may be completely independent of the order in which they are placed therein.

In a container according to the second ascpect of the invention, each compartment advantageously may have an essentially parallele piped shape in order that it is adapted to the shape of the majority of items of luggage, which most often are in the form of suitcases or bags. Each compartment may have, for example, a volume between 50 $dm^3$ and 150 $dm^3$, a volume of approximately 100 $dm^3$, i.e. 100 liters, being the preferred size.

In order to prevent items of luggage from falling out of the container, in particular during their transfers, each compartment opening may be closed for example by a door. It is also possible to make provision such that each door comprises locking elements. Thus, if a key, for example an electronic key, is associated with each door, a passenger stowing his luggage may restrict the use of the compartment in which he has introduced his things and keep the key with him throughout his journey. Upon arrival, he recovers his luggage without any risk of mistaking it for similar luggage. If the key is an electronic key, RFID (Radio Frequency Identification) technology may then be used for example for the identification of the key by the locking element, provided in that case with a suitable reader. The key, for example in the case of use for air transport, may be incorporated into the passenger's boarding card.

In order to facilitate the stowing and removal of items of luggage, the openings of the compartments may be preferably made on two opposite faces of the container, and the compartments may be arranged in two rows disposed back-to-back, each row comprising compartments themselves arranged in lines and/or columns. In this way, at least two passengers may simultaneously introduce items of luggage into the container, or remove items of luggage from the container.

In order to facilitate the handling of the container, in particular during its loading or its unloading, the latter is equipped to advantage with small wheels.

Particularly in the case of air transport, the container according to the invention preferably has the external dimensions of a loading unit. In this way, it may take its place in the hold of the aircraft like any other container transporting goods.

It should be pointed out that features or steps which have been described with reference to one of the above exemplary embodiments or with reference to one of the above aspects can also be used in combination with other features or steps of other exemplary embodiments or aspects described above.

BRIEF DESCRIPTION OF THE DRAWINGS

Below, the invention is described in more detail by exemplary embodiments with reference to the figures, in which identical or similar elements are labelled with identical or similar reference signs.

FIG. 2 shows diagrammatic views of sequences when boarding an aircraft.

FIG. 3 shows diagrammatic views of sequences when unloading an aircraft.

FIG. 4 shows detailed diagrammatic views from FIGS. 2 and 3.

FIG. 5 shows diagrammatic flow charts when boarding an aircraft.

FIG. 6 shows diagrammatic flow charts when unloading an aircraft.

FIG. 7 is a front view of a container according to a second aspect of the invention, FIG. 8 is a side view of the container of FIG. 7.

DETAILED DESCRIPTION OF EXEMPLARY EMBODIMENTS

Figure 1:
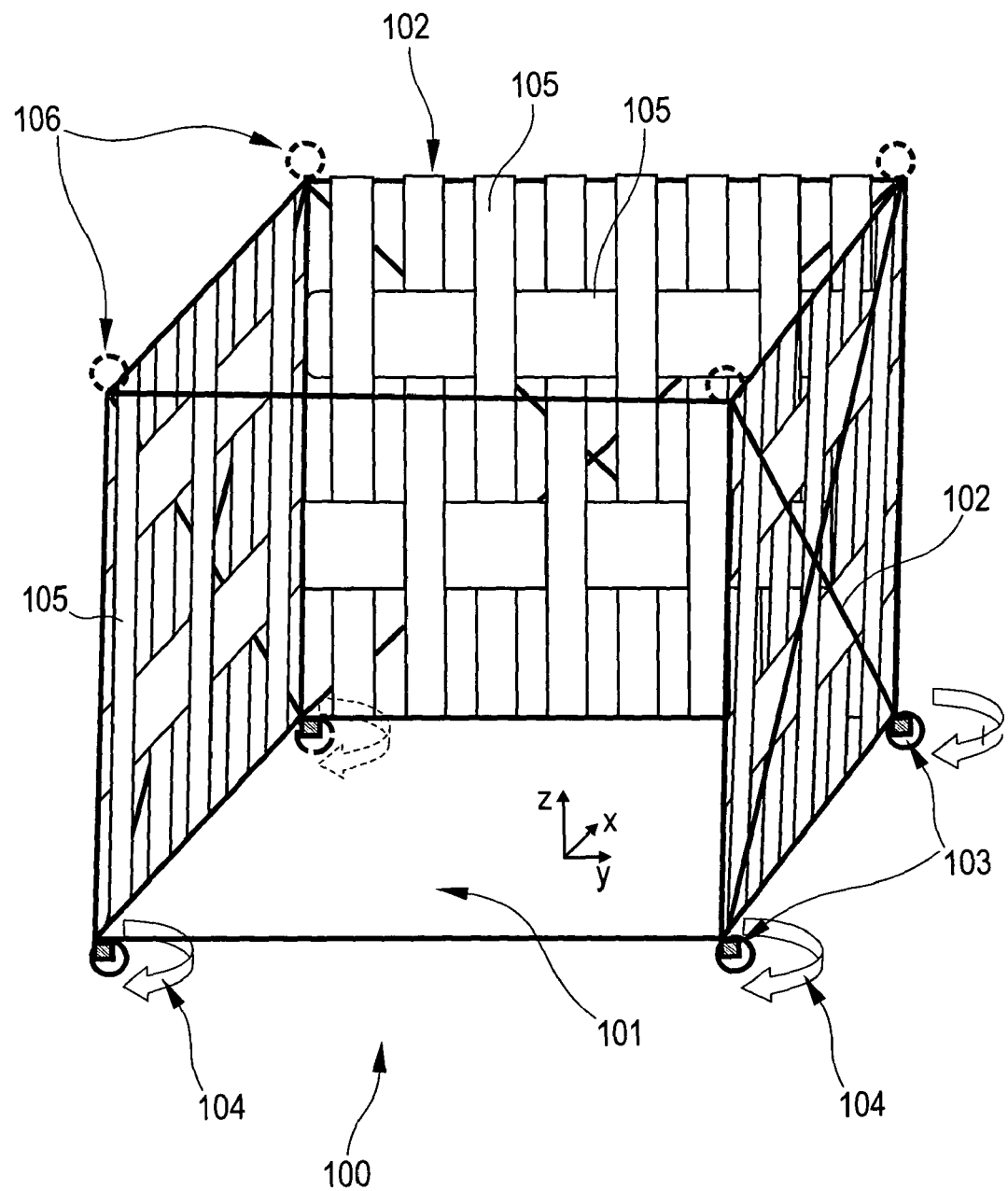
FIG. 1 shows a diagrammatic view of a baggage accommodation device according to an exemplary embodiment of a first aspect of the invention.

FIG. 1 shows a diagrammatic view of a baggage accommodation device 100 according to an exemplary embodiment of the invention. The baggage accommodation device 100, also designated as a wheely loader, is designed as a cuboid or cubic base body or container. The wheely loader 100 comprises a base plate 101 that is designed in such a way that it provides sufficient stiffness and strength for the items of baggage to be able to be stacked on it. Furthermore, the wheely loader 100 comprises a frame construction 102 that in FIG. 1 forms the outer edges of the cuboid base body. In addition, frame members 102 along the diagonals of the cuboid base body are arranged, which frame members 102 improve the stability of the frame construction. Furthermore, the wheely loader 100 comprises four rollers 103 that are arranged on the base plate 101 at its four corners. The rollers are rotatably held on a vertical axis, which in FIG. 1 is diagrammatically indicated by arrows 104. Lateral surfaces of the wheely loader 100 are formed by textile-like webbing 105 that represents a type of fabric. To this effect a first plurality of webbing is arranged vertically in FIG. 1, while a second plurality of webbing is arranged horizontally, with the webbing being intertwined in the form of a net-like structure. In this way it is possible in a simple manner to provide a stable non-slidable lateral panel. In the embodiment according to FIG. 1 additional four second rollers 106 are shown, which are arranged on upper corners of the cuboid base body. These second rollers are advantageous if the wheely loader is to be used in conjunction with an upper hinge door (see also the subsequent FIG. 4).

FIG. 2 shows diagrammatic views of sequences when boarding an aircraft, in which sequences a wheely loader according to FIG. 1 can be used. FIG. 2a, which is shown at the top of FIG. 2, shows a boarding procedure with the use of a gate as used in larger airports and/or aircraft, in association with an upper hinge door. FIG. 2a diagrammatically shows passengers 201 placing their items of baggage or their suitcases into a wheely loader 202 in the region of the gate. The full wheely loader 202 is then transported to an aircraft 203, which in FIG. 2a is only diagrammatically shown in cross section. This transport can take place automatically or by personnel. The aircraft comprises a cargo compartment door 204, which in the case of FIG. 2a is an upper hinge door. There the wheely loader 202 can be placed onto rails in the cargo compartment door by using the second rollers shown in FIG. 1, and can be pushed and/or pulled into the cargo hold door of the aircraft. This can again be carried out either semi-automatically and/or manually. For example, to this effect a cable pull or a chain pull arrangement can be used. A more detailed view of the cargo compartment door is shown in FIG. 4.

FIG. 2b, which is shown in the middle of FIG. 2, shows a boarding procedure with the use of a gate, as commonly used in larger airports and/or aircraft, in association with a lower hinge door. FIG. 2b diagrammatically shows passengers 201 placing their items of baggage or their suitcases into a wheely loader 202 in the region of the gate. The full wheely loader 202 is then transported to an aircraft 203, which in FIG. 2b is only diagrammatically shown in cross section. This transport can take place automatically or by personnel. The aircraft comprises a cargo compartment door 204 which in the case of FIG. 2b is a lower hinge door. There the wheely loader 202 can be placed onto rails in the cargo compartment door by using the second rollers shown in FIG. 1, and can be pushed and/or pulled into the cargo compartment of the aircraft. This can again be carried out automatically, semi-automatically and/or manually. For example, to this effect a cable pull or a chain pull arrangement can be used. A more detailed view of the cargo compartment door is shown in FIG. 4.

FIG. 2c, which is shown at the bottom of FIG. 2, shows a boarding procedure without the use of a gate but with the use of a lower hinge door. In FIG. 2c boarding takes place by means of a gangway directly from the movement area, as is customary in the case of smaller airports and/or aircraft. FIG. 2c diagrammatically shows passengers 201 placing their items of baggage or their suitcases in the movement area into a wheely loader 202. The full wheely loader 202 is then transported to an aircraft 203, which in FIG. 2c is only diagrammatically shown in cross section. This transport can take place automatically or by personnel. The aircraft comprises a cargo compartment door 204, which in the case of FIG. 2c is a lower hinge door. There the wheely loader 202 can be placed onto rails in the cargo compartment door by using the first rollers shown in FIG. 1, and can be pushed and/or pulled into the cargo compartment of the aircraft. This can again be carried out automatically, semi-automatically and/or manually. For example, to this effect a cable pull or a chain pull arrangement can be used. A more detailed view of the cargo compartment door is shown in FIG. 4.

FIG. 3 shows diagrammatic views of sequences when unloading or deboarding an aircraft, in which sequences a wheely loader according to FIG. 1 can be used. FIG. 3a, which is shown at the top of FIG. 3, shows an unloading procedure with the use of a gate as used in larger airports and/or aircraft, in association with an upper hinge door. FIG. 3a diagrammatically shows passengers 301 leaving an aircraft 303. At the same time a wheely loader 302 is unloaded from the cargo compartment. As is the case in FIG. 2a, FIG. 3a shows an upper hinge door 304. Unloading from the aircraft can again take place automatically, semi-automatically and/or manually. For example, to this effect a cable pull or a chain pull arrangement can be used. The full wheely loader 302 is then transported to a gate. This can take place automatically or by personnel. At the gate, passengers can then remove their suitcases from the wheely loader 302.

FIG. 3b, which is shown in the middle of FIG. 3, shows an unloading procedure with the use of a gate as used in larger airports and/or aircraft, in association with a lower hinge door. FIG. 3b diagrammatically shows passengers 301 leaving an aircraft 303. At the same time a wheely loader 302 is unloaded from the cargo compartment. As is the case in FIG. 2b, FIG. 3b shows a lower hinge door 304. Unloading from the aircraft can again take place automatically, semi-automatically and/or manually. For example, to this effect a cable pull or a chain pull arrangement can be used. The full wheely loader 302 is then transported to a gate. This can take place automatically or by personnel. At the gate, passengers can then remove their suitcases from the wheely loader 302.

FIG. 3c, which is shown at the bottom of FIG. 3, shows an unloading procedure without the use of a gate and with the use of a lower hinge door. In FIG. 3c boarding takes place by a gangway directly from the runway area, as is customary in the case of smaller airports and/or aircraft. FIG. 3c diagrammatically shows passengers 301 leaving an aircraft 303. At the same time a wheely loader 302 is unloaded from the cargo compartment. As is the case in FIG. 2c, FIG. 3c shows a lower hinge door 304. Unloading from the aircraft can again take place automatically, semi-automatically and/or manually. For example, to this effect a cable pull or a chain pull arrangement can be used. The full wheely loader 302 is then transported to a gate. This can take place automatically or by personnel. At the gate, passengers can then remove their suitcases from the wheely loader 302.

FIG. 4 shows in more detail the procedure of loading and unloading an aircraft. FIG. 4a diagrammatically shows an aircraft fuselage 403 in which, within a cargo compartment, a plurality of wheely loaders 402 are arranged. The wheely loaders 402 can be displaced within the cargo compartment, which is indicated by a double arrow 405. This displacement within the cargo compartment is usually carried out by personnel from the airline or from the airport. FIG. 4b diagrammatically shows a procedure of unloading or loading a wheely loader 402 from or to a fuselage 403. As is the case in FIGS. 2a and 3a, FIG. 4b shows an upper hinge door 404. For the purpose of loading and unloading, the wheely loader is made to engage a rail 407 by using the second rollers 406 that are shown in FIG. 1 and indicated in FIG. 4b. Along this rail the wheely loader can then automatically and/or manually be pushed into the aircraft or pulled from the aircraft. This manual pushing or pulling is also carried out by personnel from the airline or from the airport. A dashed line 407 shows the cargo compartment door in its closed state.

FIGS. 4c and 4d show the loading or unloading procedure, analogous to the procedure shown in FIG. 4a, relating to a lower hinge door with and without gate access, as shown in FIGS. 2b, 3b, and FIGS. 2c and 3c respectively.

In the flow charts of FIGS. 5 and 6 the arrows refer to a manual loading- or unloading procedure of individual items of baggage, which procedure is carried out either by a passenger or by personnel. Hexagons describe who carries out a procedure and, in cases where several persons are required, the number of persons that are engaged in a procedure. Rectangles describe the type of procedural step that is carried out. Lastly, circles indicate the numbers of steps in the entire procedural sequence.

FIG. 5 diagrammatically shows flow charts when boarding an aircraft. The top diagram of FIG. 5a explains steps that are carried out during loading of items of baggage in the case of medium to large aircraft. In a first step a passenger is checked-in 501, which checking-in can be carried out by personnel or automatically 502. In this arrangement 503 the passenger places his/her baggage on a conveyor belt 504.

In the branch shown at the top of FIG. 5a, from the conveyor belt, the baggage is loaded 506 by workers, generally by more than two workers, into a transport vehicle 505. A driver drives 507 the transport vehicle to an aircraft, where said transport vehicle is transferred by personnel 508 to a conveyor belt loading device 509. From the conveyor belt loading device the baggage is then individually transported by personnel 510 into the aircraft, where said baggage is then stowed 512, in a cargo compartment of the aircraft, by further workers 511, generally by more than two workers.

In the branch shown at the bottom of FIG. 5a, from the conveyor belt, the baggage is loaded 514 by workers, generally by more than two workers, into a unit load device (ULD) 513. A driver drives 515 the ULD to an aircraft by using a ULD transporter 516, where said ULD is transferred by personnel 517 to a ULD loading device 518. From the ULD loading device the baggage is then transported by personnel 519 into the aircraft, where said baggage is then stowed 520 in a cargo compartment of the aircraft. This can be carried out manually or in a machine-supported manner.

In parallel to this, passengers are either conveyed to the aircraft by bus or they walk through a gate to the aircraft 521.

In FIG. 5b, which is shown in the middle of FIG. 5, steps are explained which during loading of items of baggage are carried out in the case of small aircraft that are parked away from the terminal. In a first step a passenger is checked-in 522, which checking-in can be carried out by personnel or automatically 523. Subsequently the passengers 524 and the baggage are either driven by bus 525 to a transport vehicle 526, or they walk to this transport vehicle 526. In the bus transport, too, personnel 527 are involved. At the transport vehicle the baggage is loaded by passengers into the transport vehicle 528. Subsequently, a worker 529 drives 530 the transport vehicle to an aircraft, where the baggage is individually carried into an aircraft by a worker 531, where said baggage is stowed 533 in the cargo compartment by several workers 532.

FIG. 5c, which is shown at the bottom of FIG. 5, shows a sequence in which a wheely loader is used. In a first step a passenger is checked-in 534, which checking-in can be carried out by personnel or automatically 535. Subsequently the passengers 536 and the baggage are either driven by bus 537 to a wheely loader 538, or they walk to this wheely loader 538. In the bus transport, too, personnel 539 are involved. At the wheely loader the baggage is loaded by passengers into the wheely loader 540. Subsequently, the wheely loader is moved (rolled) 542 by a worker 541 to an aircraft and is moved 543 into the aircraft.

FIG. 6 diagrammatically shows flow charts during unloading of an aircraft. In the top diagram FIG. 6a steps are explained which during unloading of items of baggage are carried out in the case of medium to large aircraft. In a first step by several workers 601 the items of baggage accommodated in the cargo compartment of an aircraft are individually brought 602 to the exit of the aircraft where the items of baggage are placed by a worker 603 onto a conveyor belt unloading device 604. From the conveyor belt unloading device the items of baggage are placed by a worker 605 in a transport vehicle 606 that is driven by a driver 607 to a carrousel system 608. There the items of baggage are placed by several workers 609 onto the carrousel system, from which they are removed by passengers 610.

In the branch shown on the bottom of FIG. 6a, a ULD is moved by a worker 611 from the aircraft 612 to a ULD unloading device 613, from which the ULD is loaded by an operator 614 to a ULD transporter 615. The ULD transporter is driven by a driver 616 to the carrousel system 608. There the items of baggage are placed by several workers 617 from the ULD 618 to the carrousel system, from which carrousel system they are removed by passengers 610.

In parallel to this, passengers are either conveyed away from the aircraft by bus, or they walk from the aircraft 619 through a gate to the airport building.

In FIG. 6b, which is shown in the middle in FIG. 6, steps are explained which during unloading of items of baggage are carried out in the case of small aircraft that are parked away from the terminal. In a first step several workers 620 pick up the items of baggage individually in the cargo compartment of an aircraft 621 and are removed from the aircraft. Subsequently the items of baggage are brought away 623 from the aircraft by a worker 622 and are placed in a transport vehicle 625 by a driver 624. The transport vehicle is brought by the driver to a collection point at which the passengers 626 remove their baggage. Subsequently the passengers and the baggage are onward-conveyed by bus 628, wherein a driver 627 is involved, or the passengers 629 continue onward on foot and leave the movement area.

FIG. 6c, which is shown at the bottom of FIG. 6, shows an unloading sequence in which a wheely loader is used. In a first step the wheely loader is moved by a worker 630 from the cargo compartment 631 of an aircraft. This can be carried out manually or by machine support. The wheely loader is then moved away 632 from the aircraft. Subsequently passengers 633 take their baggage from the wheely loader 634. Thereafter the passengers and the baggage are onward-conveyed by bus 635, wherein a driver 636 is involved, or the passengers 637 continue onward on foot, for example through a gate, through which they have left the aircraft.

In the following the second ascpect of the invention will be described in greater detail with reference to the FIGS. 7 and 8.

The person skilled in the art recognises in the drawings a container assuming the external shape of a loading unit (referred to as a Unit Load Device, abbreviated to ULD) also known under the name LD3-46. It concerns a container whose shape and dimensions are standardised. The container represented here has a height H, a length L1 and a width (or depth) L2. It will be noted that the lower part of container 702 has, in the front view (FIG. 7), a trapezoidal shape which permits it to be adapted to the rounded shape of the fuselage of an aircraft, thereby optimising the loading volume. By way of non-limiting numerical examples, it is possible for example to have: H=1.143 m, L1=2.438 m and L2=1.534 m.

The aforementioned shape and dimensions shown in the drawings are given purely by way of illustration. The second aspect of the present invention can be applied on the one hand to other standardised containers and on the other hand to containers whose dimensions and/or shape may differ from the dimensions and/or shapes of a standardised loading unit.

The container shown in the drawings comprises an upper face 704, a lower face 706, a front face 708, a rear face 710 and lateral faces 712.

In an exemplary embodiment of the second aspect represented in the drawings, lower face 706 of container 702 carries four small wheels 714. The latter are mounted so as to be able to pivot about an axis perpendicular to lower face 706, thus facilitating changes in direction of container 702 when the latter is moved or rolled on the ground.

The internal volume of container 702 is divided into compartments 716 with the aid of internal partitions.

In the following description, it is assumed that container 702 is placed on a horizontal plane. Its upper face 704 and its lower face 706 are therefore in a plane which is also horizontal, whilst front face 708 and rear face 710 are vertical.

Among the internal partitions, there is in the first place a vertical transverse partition 718. The latter is located in a central position between front face 708 and rear face 710. It divides the container into two equal volumes. Each of these two volumes is for its part divided into compartments 716 on the one hand by horizontal partitions 720 and on the other hand by vertical longitudinal partitions 722.

The partitions used to realise the container described above can be solid partitions, but in order to permit a saving on weight they may also be partitions realised as grills.

Each of compartments 716 thus realised has an opening emerging either in front face 708 or in rear face 710 of container 702. Compartments 716 are disposed here in two rows 724 separated by vertical transverse partition 718. In each of these rows 724, compartments 716 are arranged in lines and/or columns. In the embodiment shown in FIGS. 7 and 8, it is thus possible to see a first line 726 of compartments located in the lower part of container 702. Two other lines 728 are disposed in the upper part of container 702. Compartments 716 of these two other lines 728 are disposed here in two lines and five columns. A total of fifteen compartments 716 can thus be counted in each of rows 724, i.e. a total of thirty compartments 716 in container 2.

Each compartment has a volume between 50 and 150 $dm^3$, preferably between 100 and 110 $dm^3$. Purely by way of illustrative examples, numerical values are indicated below. In a preferred embodiment, all compartments 716 have the same depth P. The latter is for example between 70 cm and 80 cm. The compartments of first line 726 have for example a width l of the order of 30 cm, whilst height h is for example between 45 cm and 50 cm. For the compartments of the two other lines 728, width l' is for example between 45 cm and 50 cm, whilst height h' of these compartments is for example of the order of 30 cm.

Such a container is more particularly intended to receive items of luggage of aircraft passengers. Provision can be made, for example, to dispose a container 702 on the route taken by the passengers between the boarding desk and the aircraft. The passengers can then place their item(s) of luggage in compartment 716 of the container. This is similar to the boarding procedure described above with reference to the first aspect of the present invention.

In a preferred variant of embodiment, each opening of compartments 716 is provided with a door (not shown). This door can be closed once the item of luggage is placed inside the compartment, in order to avoid any items of luggage falling out when the container is subsequently conveyed to the aircraft.

In a preferred embodiment, each compartment door is provided with locking elements controlled by a key, for example an electronic key. Each compartment is, for example, then numbered and the key corresponding to a compartment also carries the number of the compartment. The passenger, having disposed an item of luggage into a compartment 716 of the container, closes the latter with the key, retaining the electronic key for the duration of the journey. At the end of the journey, container 702 inside which the items of luggage are located is unloaded as a priority so that it can be made available to passengers when the latter leave the aircraft. Each passenger can then open, with his electronic key, the compartment containing the item of luggage that he has stowed there when embarking the aircraft.

The electronic key, and the corresponding container, use for example RFID (Radio Frequency Identification) technology. The passenger thus receives a badge incorporating a marker and the doors of the container for their part each contain a reader. The marker is a passive device comprising in particular a chip and an antenna. It can be incorporated into a passenger's boarding card in the case of application to air transport. The boarding card thus serves as a badge for the passenger and thus as a key for the compartment containing his item of luggage.

In the case of air transport, the use of a container with standardised shape and dimensions is of course very advantageous. Such a container can in fact be handled quite habitually by the personnel at an airport. However, the container may also have the shape of a cuboid or a cube as described above with reference to the first aspect of the invention.

The fact that compartments are provided in the container may make it possible to facilitate the unloading of items of luggage. Similarly, the fact that lockers are provided disposed in two rows may allow at least two passengers to remove their luggage at the same time.

The present invention is not limited to the preferred embodiment and the variants described above by way of non-limiting examples. It also relates to all the variants of embodiment within the purview of the person skilled in the art, within the scope of the following claims.

Thus, for example, a container as described above could be used for passengers taking a train or another means of transport (a ship, for example).

In addition, it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other characteristics or steps of other exemplary embodiments described above. Reference signs in the claims are not to be interpreted as limitations.

The invention claimed is:

1. A cargo hold door and a baggage accommodation device for an aircraft,
    wherein the cargo hold door comprises at least one rail, and is configured as an upper hinge door;
    wherein the baggage accommodation device comprises:
    a plurality of first rollers;
    a container comprising a base plate; and
    a plurality of second rollers;
    wherein the plurality of second rollers are arranged on a top of the container and are adapted for engaging the at least one rail along which the baggage accommodation device can be pushed into the aircraft or pulled from the aircraft;
    wherein the plurality of first rollers are arranged on the base plate;
    wherein the baggage accommodation device is sufficiently stable for the baggage accommodation device to be able to be moved into and out of the aircraft; and
    wherein the at least one rail is configured to accommodate the plurality of second rollers.

2. The cargo hold door and baggage accommodation device of claim 1, wherein the container comprises a plurality of substantially vertical lateral surfaces,
    wherein one of the vertical lateral surfaces is open, or
    wherein all the vertical lateral surfaces are closed.

3. The cargo hold door and baggage accommodation device of claim 1,
    wherein the container comprises a frame construction.

4. The cargo hold door and baggage accommodation device of claim 2,
    wherein the material of the vertical lateral surfaces comprises at least one of a textile webbing and metal.

5. The cargo hold door and baggage accommodation device of claim 1,
    wherein the plurality of first rollers are rotatably arranged on the base plate.

6. The cargo hold door and baggage accommodation device of claim 2, which further comprises a removable lateral panel wherein by the panel the open, vertical, lateral surface can be closed.

7. The cargo hold door and baggage accommodation device of claim 1, wherein the baggage accommodation device has dimensions to match dimensions of a cargo hold of an aircraft.

8. The cargo hold door and baggage accommodation device of claim 1, wherein the baggage accommodation device can be fastened in a cargo hold of an aircraft.

9. The cargo hold door and baggage accommodation device according to claim 1,
    wherein the container comprises internal dividing walls demarcating compartments, each compartment being adapted to receive an item of luggage, and
    wherein each compartment comprises an opening permitting access to the compartment from outside the container.

10. The cargo hold door and baggage accommodation device according to claim 9,
    wherein each compartment has a substantially parallelepiped shape.

11. The cargo hold door and baggage accommodation device according claim 9,
    wherein each compartment has a volume between 50 and 150 $dm^3$.

12. The cargo hold door and baggage accommodation device according to claim 9,
    wherein each opening of a compartment is closed by a door.

13. The cargo hold door and baggage accommodation device according to claim 12,
    wherein each door comprises a locking element.

14. The cargo hold door and baggage accommodation device according to claim 13,
    wherein the locking elements are controlled with the aid of an electronic key.

15. The cargo hold door and baggage accommodation device according to claim 14,
    wherein the electronic key uses RFID technology.

16. The cargo hold door and baggage accommodation device container according to claim 9,
    wherein the openings of the compartments are disposed on two opposite faces of the container, and the compartments are arranged in two rows disposed back-to-back, each row comprising compartments themselves arranged in lines and/or columns.

17. The cargo hold door and baggage accommodation device according to claim 9,
    wherein the container is provided with wheels.

18. The cargo hold door and baggage accommodation device according to claim 9,
    wherein the container has the external dimensions of a loading unit.

19. The cargo hold door of claim 1, wherein the cargo hold door is configured as an outer fuselage door for an aircraft.

20. The cargo hold door of claim 1, further comprising a transport device,
    wherein the transport device is configured such that the baggage accommodation device can be moved by the transport device.

21. An aircraft comprising:
    a cargo hold; and
    a cargo hold door comprising at least one rail,
    wherein the cargo hold door is configured as an upper hinge door;
    wherein the baggage accommodation device comprises:
    a plurality of first rollers;
    a container comprising a base plate; and
    a plurality of second rollers;
    wherein the plurality of second rollers are arranged on a top of the container and are adapted for engaging the at least one rail along which the baggage accommodation device can be pushed into the aircraft or pulled from the aircraft;
    wherein the plurality of first rollers are arranged on the base plate; and
    wherein the baggage accommodation device is sufficiently stable for said baggage accommodation device to be able to be moved into and out of the aircraft; and
    wherein the at least one rail is configured to accommodate the second rollers that are arranged at the top of the baggage accommodation device.

22. The aircraft of claim 21,
wherein the cargo hold comprises a rail system that is designed such that the baggage accommodation device can be accommodated.

23. The aircraft of claim 21, further comprising a transport device,
wherein the transport device is configured such that the baggage accommodation device can be moved by the transport device.

24. A method for operating a baggage accommodation device, a cargo hold door, and a cargo hold;
wherein the baggage accommodation device comprises:
a plurality of first rollers;
a container comprising a base plate; and
a plurality of second rollers;
wherein the plurality of first rollers are arranged on the base plate;
wherein the baggage accommodation device is configured such that it is sufficiently stable for said baggage accommodation device to be able to be moved into and out of the aircraft; and wherein the plurality of second rollers are arranged on a top of the container; and
wherein the cargo hold door comprises:
at least one rail;
wherein the cargo hold door is configured as an upper hinge door;
wherein the at least one rail is configured to accommodate the baggage accommodation device;
wherein the cargo hold comprises:
a rail system wherein a baggage accommodation device can be accommodated; and wherein said method comprises the steps of:
loading items of baggage on the baggage accommodation device;
conveying the baggage accommodation device to the cargo hold door of the aircraft;
engaging the at least one rail by using the second rollers;
pushing the baggage accommodation device along the at least one rail into the aircraft; and
placing the baggage accommodation device in the cargo hold of the aircraft or pulling the baggage accommodation device along the at least one rail from the aircraft.

* * * * *